United States Patent

Wacinski et al.

[11] Patent Number: 5,911,381
[45] Date of Patent: Jun. 15, 1999

[54] STOCKING DEVICE FOR COILABLE ELEMENTS AND METHOD OF USE

[75] Inventors: Andrzej Wacinski, Massongex; Gérard Plumettaz, Bex, both of Switzerland

[73] Assignee: Plumettaz AS, Bex, Switzerland

[21] Appl. No.: 08/989,464

[22] Filed: Dec. 12, 1997

Related U.S. Application Data

[63] Continuation-in-part of application No. 08/737,114, filed as application No. PCT/CH95/00104, May 5, 1995, abandoned.

[30] Foreign Application Priority Data

May 11, 1994 [CH] Switzerland .............................. 1480/94
Jul. 24, 1997 [EP] European Pat. Off. .............. 97810530

[51] Int. Cl.⁶ .......................... B21C 47/10; B65H 49/00; B65H 59/16
[52] U.S. Cl. ...................... 242/361.4; 242/128; 242/156; 242/157 R
[58] Field of Search .................................. 242/361, 361.4, 242/363, 360, 157 R, 156, 128, 129

[56] References Cited

U.S. PATENT DOCUMENTS

| | | | |
|---|---|---|---|
| Re. 34,488 | 12/1993 | Clark . | |
| 373,463 | 11/1887 | Lenox | 242/361 X |
| 2,227,442 | 1/1941 | De Millar | 242/361.4 |
| 2,319,828 | 5/1943 | Rohweder | 242/128 |
| 3,039,715 | 6/1962 | Caperton | 242/361.4 X |
| 3,750,974 | 8/1973 | Dibrell | 242/47 X |
| 3,765,614 | 10/1973 | Bartl et al. | 242/47 |
| 4,513,922 | 4/1985 | Dufour | 242/361.4 X |
| 4,523,724 | 6/1985 | Rerolle | 242/361.4 X |
| 5,374,005 | 12/1994 | Jenkins et al. | 242/361.4 |

FOREIGN PATENT DOCUMENTS

| | | |
|---|---|---|
| A-0 008 352 | 3/1980 | European Pat. Off. . |
| A-0 292 037 | 11/1988 | European Pat. Off. . |
| A-0 296 860 | 12/1988 | European Pat. Off. . |
| A-0 389 303 | 9/1990 | European Pat. Off. . |
| A-2 015 977 | 8/1969 | France . |
| 2 371 372 | 11/1976 | France . |
| B 2 202 177 | 4/1977 | Germany . |
| WO 95/31392 | 11/1995 | WIPO . |

*Primary Examiner*—Michael Mansen
*Attorney, Agent, or Firm*—Oliff & Berridge, PLC

[57] ABSTRACT

A process and apparatus for stocking cables and other coilable elements such as, for example, hosepipes, pipes and tubes. A stocking device includes a stocking basket formed by a circular outer wall. An edge of a bottom wall serving as a winding base is disposed against the outer wall. A guide member and a fixed or rotary laying stocking device assist in coiling the element. The laying stocking device angularly leads the element to be coiled from the guide toward the stocking basket. At least one height adjustment mechanism is also provided. The height adjustment mechanism adjusts the height of the laying device in order to insure that there is ample space between a stack of the coilable elements in the stocking basket and the laying device. The height adjustment mechanism may be automatic, manual or self regulating.

42 Claims, 8 Drawing Sheets

STOCKING DEVICE FOR COILABLE ELEMENTS AND METHOD OF USE

This is a Continuation-in-Part of Application Ser. No. 08/737,114 filed Nov. 4, 1996, now abandoned, which is a §371 of PCT/CH95/00104 filed on May 5, 1995. The entire disclosure of the prior application is hereby incorporated by reference herein in its entirety.

BACKGROUND OF THE INVENTION

1. Field of Invention

The invention relates to a stocking device and a process for stocking coilable elements such as cables, hosepipes, pipes, tubes, etc. in the stocking device. The invention further relates to stocking of all types of cables having a certain rigidity, i.e., capable of withstanding a certain axial compressive stress, without excessive buckling of the cables.

2. Description of Related Art

Installation of underground cables is quite complex due in part to the considerable lengths of the cables. This is particularly common with optical-type cables. In order to properly install these cables, a minimum number of cable splices is desired so as to maximize the quality of the signal carried through the cable. In order to accomplish the minimum amount of cable splices, a first portion of the cable is installed in a first tube heading in a given direction over several tens or hundreds of meters. A second portion of cable is then installed in a second tube, the opening of which is near the opening of the first tube. However, the second tube is usually oriented in a different direction from the first tube. By installing the two portions of the cable into the different tubes, a greater length without having to splice the cables is achieved.

However, in order to access the end of the cable which is in the opening of the second tube, the second portion must first be unwound from the cable roll. In order to uncoil the second portion of cable, it is necessary to carry out an intermediate stocking process which consists of uncoiling the cable on the ground and forming two juxtaposed circles. This method is often designated by the term "figure 8 technique". However, this technique presents numerous drawbacks including excess room and labor in order to, for example, (i) form the necessary circles and/or (ii) prevent the cable from becoming soiled. This method also presents risks for the wholeness of the cable and is slow and expensive to utilize.

The "Van Den Akker Reel" represents another method of coiling cables. In this method, the cable is not disposed on the ground. However, the Van Den Akker Reel includes successive stages of winding and unwinding which requires extensive time and labor. Moreover, it is still necessary to form Figure 8 loops over a portion of the length of the cable.

DE-C-22 02 177, FR-A-2015 977, EP-A 0 008 352 and EP-A-0 389 303 describe methods for winding and unwinding cables in a cylindrical stocking basket. These methods require a device for driving the cable and/or a device for rotating a laying arm. For example, the EP-A-0 389 303 device uses a stream of gas for rotating the laying arm. These methods also usually involve a device to synchronize between driving the cable and rotating the laying arm.

The American Document RE 34 488 describes a stocking device for winding a cable about a roll having a horizontal axis. This stocking device requires powerful drive means in order to carry out the winding. Also, the installation of this device requires numerous attachments for safety purposes, and in particular, for avoiding any contact with the rotating elements. This stocking device is very costly and complicated to use; compared with an installation comprising few or no rotary elements and/or driving devices.

As a further example, EP-B-0 296 860 describes a stocking device capable of being used as an intermediate stocking device having a stocking basket. This stocking device comprises a mechanical device that rotates a laying arm. This mechanical device has to be synchronized with a device that drives the cable. Also, in order to retrieve the lower end of the cable inserted on the bottom of the stocking basket, a number of manipulations to the basket, including an inversion operation must be performed. This stocking device can only be used with low-mass optical cables.

SUMMARY OF THE INVENTION

An object of the invention is to provide a stocking device that allows a coilable element (e.g., cable) to be coiled in a stocking basket by using the mechanical properties of the cable and, in particular, its longitudinal rigidity. This avoids the use of (i) a driving device for driving one or more parts and (ii) a synchronization device for correctly disposing the cable within the basket.

A further object of the invention is to provide a stocking device having a height adjustment device.

Another object of the invention is to provide a stocking device that is capable of being combined with a second stocking device in order to stock and manufacturing a long cables using two stocking devices.

Still another object of the invention is to provide a stocking device that is capable of winding a cable without having to place the cable on the ground.

Still a further object of the invention is to provide a stocking device that requires little labor, few manipulations and allows for high speed winding and unwinding operations without having to be reconfigured.

Still another object of the invention is to provide a stocking device that allows stocking of cables without having access to an end of the cable. This is particularly advantageous for intermediate stocking when installing cables and, in particular, cables comprising one or more optical fibers.

An additional object of the invention is to provide a stocking device that does not have a winding arm.

The present invention includes a stocking device having a stocking basket. The stocking basket has a bottom and two opposing side walls. The bottom serves as a winding base. A guide device is disposed proximate to the stocking basket. In preferred embodiments, the guide device has an opening formed on an outer wall. In further preferred embodiments, the stocking basket has an opening in its outer wall. The openings in the guide device and the stocking basket permit a cable to be attachably inserted and withdrawn from the stocking device.

In embodiments, a laying device is provided proximate to the guide device. The laying device angularly leads a portion of the cable to be coiled from the stocking device to the stocking basket. In embodiments, the laying device may be fixed or rotatable. In the case of a rotary laying device, a tube extends from approximately one end of the guide device to the stocking device.

In embodiments, the rotary laying device has a height adjustment device. The height adjustment device may be manual, automatic or self-regulating. When the height adjustment device is self-regulating, it is controlled directly by the coiled element. That is, the longitudinal rigidity of the coiled element controls the height of the laying device. A height regulating device may also be provided.

The invention also provides a method of coiling and uncoiling cables in the stocking device. The method can also be used to coil cables in two or more stocking devices. In preferred embodiments, the method comprises passing a portion of the cable through the guide device. The cables are moved toward the stocking basket so that the cable naturally coils in the stocking basket. The cables are preferably inserted and withdrawn from the stocking device through openings in the stocking basket and the guide device. In embodiments, the height of the cables in the stocking basket adjusts the height of the laying device.

These and other aspects and salient features of the invention will be described in or are apparent from the following detailed description of preferred embodiments.

BRIEF DESCRIPTION OF THE DRAWINGS

Preferred embodiments of the invention will be described in conjunction with the following drawings, in which.

DETAILED DESCRIPTION OF PREFERRED EMBODIMENTS

Figure 1:
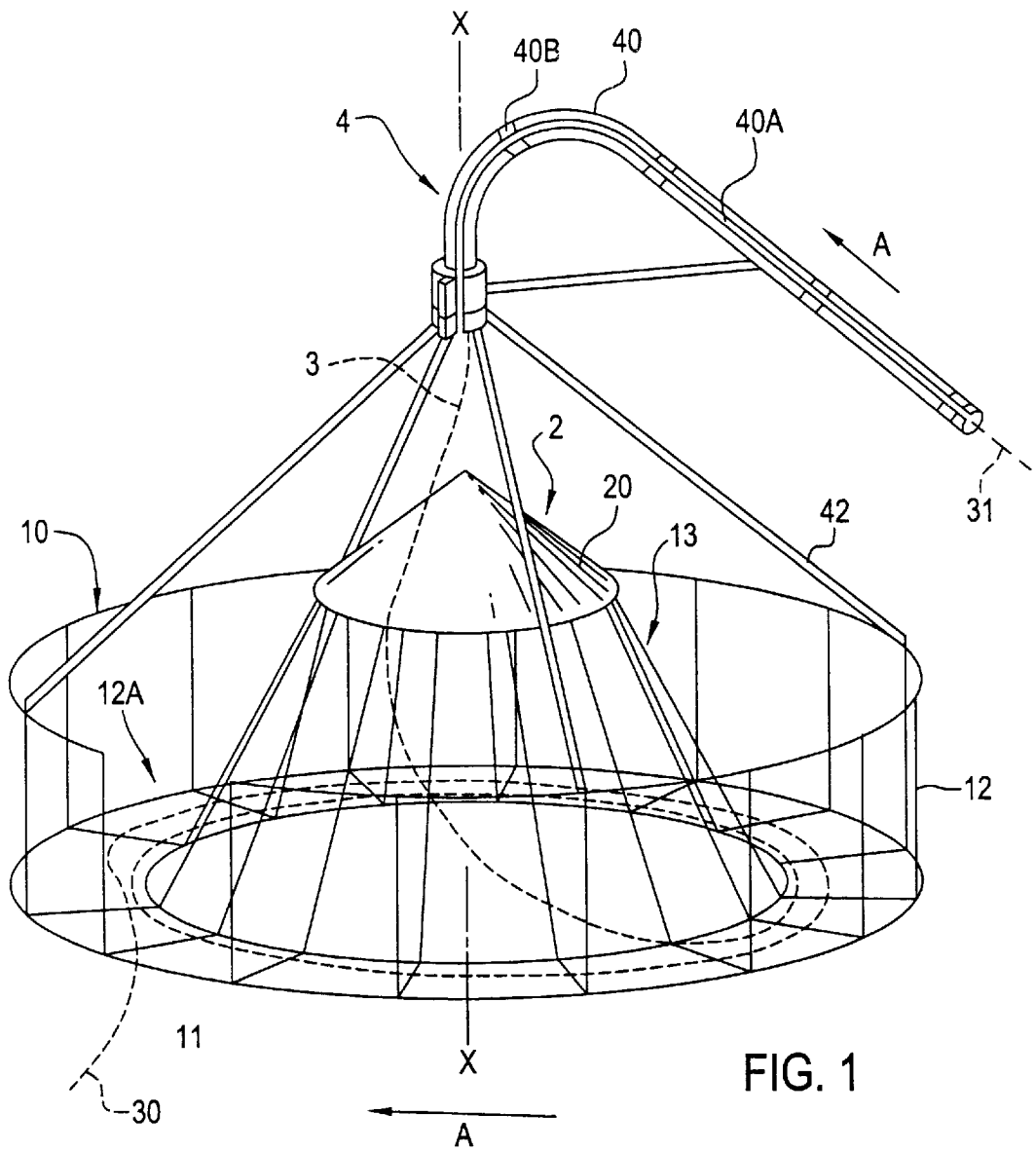
FIG. 1 shows a perspective view of a first embodiment of a stocking device according to the invention.
Figure 2:
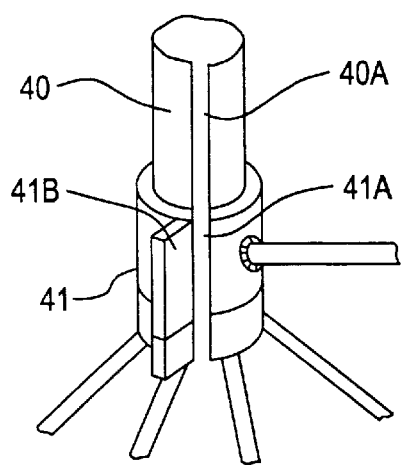
FIG. 2 shows an exploded view of a guiding stocking device.

FIG. 1 shows a stocking device 1. The stocking device 1 includes a substantially cylindrical shaped stocking basket 10 having an annular right section. The stocking basket 10 includes a bottom 11 spanning between an outer wall 12 and an inner wall 13. Both the bottom 11 and the inner and outer walls 12, 13 may have a solid or lattice surface. The outer wall 12 rises from the bottom 11 to a given height which provides a lateral holding support for the wound cable. The inner wall 13 rises from the bottom 11 to a given height, generally greater than that of the outer wall 12. In order to be able to use the stocking device 1 for intermediate stocking, the outer wall 12 has a lateral opening 12A which permits a portion of the cable 3 to be inserted in the opening 12A.

A fixed cable-laying device 2 is disposed in a central portion of the stocking basket 10. In embodiments, the laying device 2 is shaped by the inner wall 13, which forms a frustum of a cone. The top of the frustum is closed by a convex cover 20. In embodiments, a partially conical fixed laying device 2 is provided. The partially conical fixed laying device 2 may be formed in one or more parts. The wall of the partially conical fixed laying device 2 may be completely solid or partially solid (e.g., a lattice).

A guide device 4 is disposed in the prolongation of the fixed laying device 2. The guide device 4 comprises a guide tube 40 and preferably a pivoting bushing 41. The guide tube 40 may be metallic or synthetic and preferably includes a smooth inside wall having a low coefficient of friction. The inside diameter of the guide tube 40 is preferably larger than the outside diameter of the stocked cable 3.

The guide device 4 is supported, for example, by one or more rods 42 extending from the outer wall 12. For example, a lower portion of the bushing 41 may be fixed to the rods 42. In this case, an upper portion of the bushing 41, preferably pivoting with respect to the lower portion, receives one end of the guide tube 40. The guide device 4 is preferably disposed coaxially according to a virtual axis X—X which may be that of the stocking basket 10.

In case the bushing 41 is pivotable, the guide tube 40 may pivot about the axis X—X in order to orient itself automatically in the direction of the cable roll (not shown) from which the cable 3 is unwound toward the tube and the stocking basket 10 for laying. In embodiments, lateral openings 40A and 41A may be provided on the guide tube 40 and the bushing 41, respectively. This enables the cable 3 to be inserted and withdrawn from the stocking device 1, i.e., inserted and withdrawn in the guide tube 40 and bushing 41. Suitable closing devices 40B and 41B, known to those skilled in the art, reclose the openings in order to hold the cable 3 in the guide tube 40 and bushing 41.

A cable-driving stocking device (not shown) may supplement the stocking device 1 without directly forming part of the stocking device 1. The cable-driving stocking device is preferably disposed on the free portion of the cable 3 entering or leaving the end of the guide tube 40, remote from the bushing 41. The cable-driving stocking device may, for example, be a caterpillar or grip-pulley drive device.

A cable-laying operation using a stocking device 1 according to the invention may now be described. First, an end 30 of the cable 3 disposed from a top layer of turns of a cable roll (generally a horizontal-axis roll) is drawn and placed in a first length of tubing according to a known technique. Then, the remaining length of cable 3 is withdrawn in order to insert it in a second tube along which the remaining length of cable which will later be drawn. This is performed so that the cable still wound on the cable roll can reach the other end of the cable 3. For this purpose, a stocking device 1 according to the invention is disposed on the free length of the cable 3, between the cable roll and the entrance of the first tube. The cable 3 is inserted in the stocking device 1 by causing it to pass through the openings 12A, 40A and 41A. The lateral openings 40A and 41A are then reclosed in order to hold the cable within the guide tube 40 and the bushing 41, respectively.

Revisiting FIG. 1, the end 30 of the cable 3 leaving through the opening 12A is directed toward the portion of the cable 3 already placed in the first tube. However, the end 30 is directed toward the driving stocking device 1, and the cable roll still contains the remaining length of cable 3. By actuating the driving device, the cable 3 can be transported from the cable roll toward the stocking basket 10. The cable 3 then passes through the guide tube 40, which is now oriented in the direction of the cable roll (if the bushing 41 is pivotable), and passes through the bushing 41. At this point, the cable 3 enters the space situated above the stocking basket 10 along the axis X—X. The cable 3 then contacts the convex cover 20 of the laying device 2 and rests on the cover 20 and the inner wall 13.

By imparting a translatory movement to the cable 3 (in the direction of the arrow A), the cable 3 rests along the cover 20 and outer wall 13, while making a turn of approximately 90 degrees toward the rear of the stocking basket 10. The cable 3 then coils up on the bottom 11 of the stocking basket 10 due to a reaction caused by a longitudinal rigidity of the cable 3. A number of turns are thus wound in the stocking basket 10 until the end of the cable 3 disposed on the bottom layer of the cable roll is freed and can be inserted into the second tube. The driving direction of the driving stocking device is then reversed so that the cable 3 can be withdrawn from the stocking basket 10 and placed in the second tube. When the last turn has been unwound from the stocking basket 10, the stocking device 1 can be disengaged from the cable 3 through the openings 12A, 40A and 41A.

The stocking device 1 may also be used for transwinding, i.e., to reverse the winding direction of a cable. In this case, the openings 12A, 40A, and 41 A need not be provided and the end 30 of the cable 3 can be inserted through the free end of the guide tube 40. Then, the end 30 can be fixed to the bottom 11. After the cable 3 is coiled in the stocking basket 10, the cable 3 can be paid out in a reverse direction.

According to this embodiment of the stocking device 1, there are no moving parts when the cable 3 is being stocked and/or unstocked. Thus, driving devices or synchronization devices are not required. As described above, the winding of the cables 3 is produced by its longitudinal rigidity.

Figure 3:
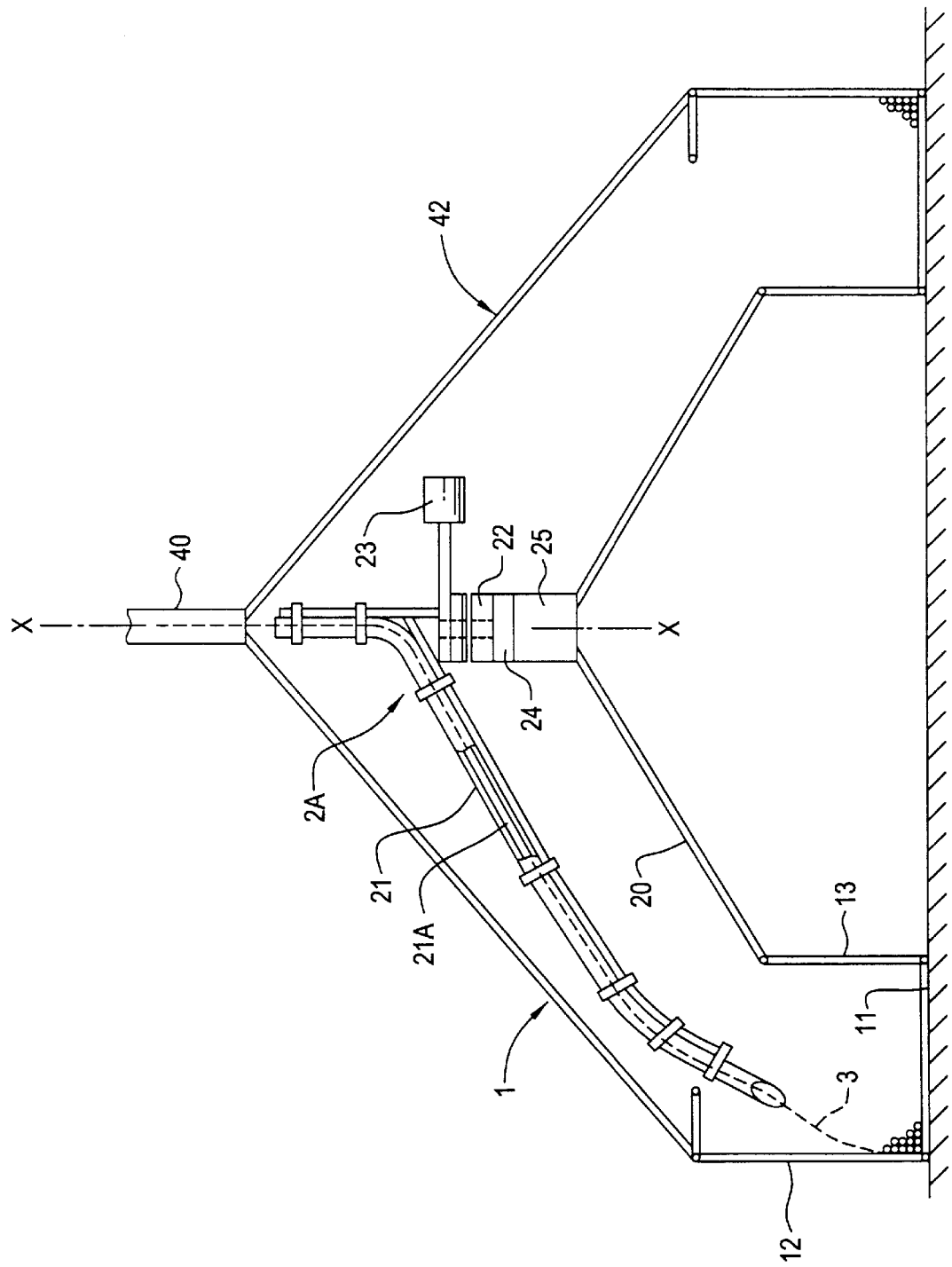
FIG. 3 shows another embodiment of the stocking device with a rotary arm.

FIG. 3 shows another embodiment of the invention having a laying tube 21. The laying tube 21 aids in the proper winding of the cable 3 in the stocking basket 10 when the cable 3 does not have sufficient longitudinal rigidity. In embodiments, the laying tube 21 pivots about the X—X axis and is supported by known rotation stocking devices 22. Preferably, the rotation stocking device 22 includes a braking stocking device 24, for example, a friction stocking device, which imparts a slight braking torque to the rotation of the laying tube 21 when the cable 3 is coiled in the stocking basket 10. This braking torque stabilizes the distribution of the torsion torque over the length of the cable 3. In preferred embodiments, braking is not imparted when the cable 3 is unwinding.

In embodiments, the laying tube 21 is supported by an inside frame comprising the inner wall 13 and the convex cover 20. The convex cover 20 also serves to limit the space allotted to the cable 3. The laying tube 21 may also be supported by an outside frame comprising the outer wall 12 and the rods 42. In embodiments, a counterweight 23 ensures the static balance of the laying tube 21. The laying tube 21 may also have a lateral opening 21A in order to insert the cable 3 therein.

A lower end of the laying tube 21 is disposed within the stocking basket 10 and is directed preferably toward the outer wall 12. The outer wall aids in the proper coiling of the cable 3. When the cable 3 is being uncoiled, the cable pushes the laying tube 21 toward the front of the stocking basket 10 causing it to pivot about the axis X—X. This is due to the longitudinal rigidity of the cable 3. When the cable 3 is uncoiled, the laying tube 21 pivots in the opposite direction. The inner wall 13 then serves as a guide to limit the tightening of the cable 3 when being unwound.

The stocking devices may also include a height adjustment device 25 for adjusting the height of the laying tube 21. The height adjustment device 25 facilitates the arrangement of the cable 3 within the stocking basket 10 when winding a very long cable. The height-adjustment device 25 may be controlled manually or automatically.

According to this embodiment of the invention, only a single moving part, e.g., the laying tube 21 is provided. As described above, the laying tube 21 does not require a driving device because the rotation of the laying tube 21 is directly caused by the advance of the cable, in either direction.

Further designs of the stocking device are also envisioned. In particular, the inner and outer walls 12, 13 may be inclined in order to facilitate the winding and unwinding of the cable 3 in the stocking basket 10. Also, the guide tube 40 and/or the laying tube 21, may comprise a succession of rings disposed along a bar of suitable shape. In embodiments, each ring comprises a lateral opening, the direction of which is shifted from that of the ring which precedes it. In this manner, the cable 3 may be inserted successively into each ring and the combination of the solid portions and the openings of the rings will hold the cable 3 therein. The stocking device 1 can also be dismantled (or folded up) in order to transport it more easily to a laying site. The stocking device 1 may also be used with the method and means described in the document EP-A-0 292 037. Tests carried out with the aid of such a system permitted winding and/or unwinding speeds on the order of 1 to 5 m/s.

Figure 4:
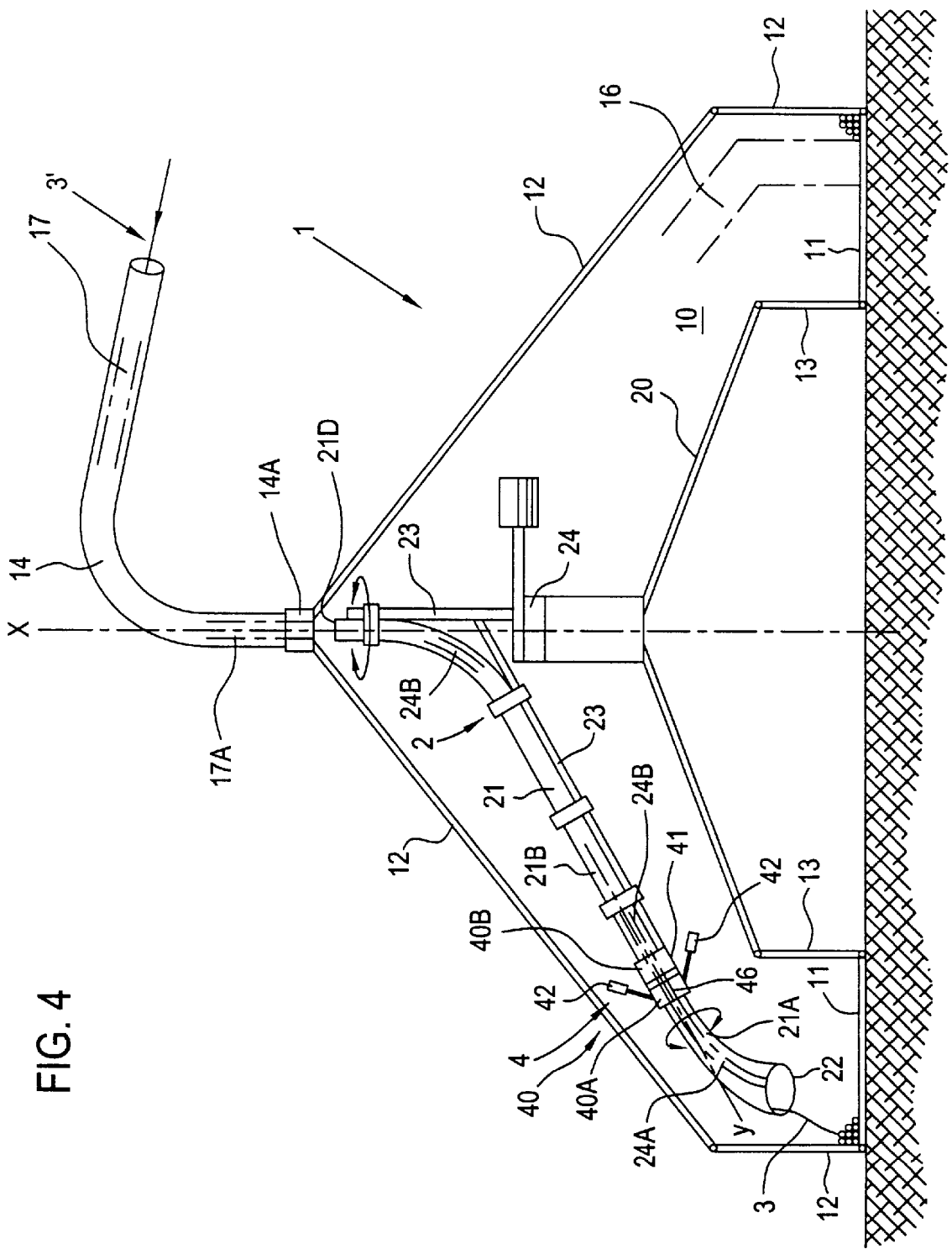
FIG. 4 shows a stocking basket equipped with a laying stocking device having a self-regulating height device.

FIG. 4 shows another embodiment of the stocking basket 10. The stocking basket 10 of this embodiment is similar to the stocking basket 10 as described with reference to FIG. 3. In this embodiment, the laying device 2 includes a laying tube 21 having an upper opening 21D which is coaxial to the X—X axis and opposite the lower opening 22 of the guide stocking device 14 or the pivoting guide collar 14A. The lower opening 22 is generally disposed in the stocking space limited by the inner and outer walls 12, 13 and the bottom 11. The opening 22 is oriented to permit correct coiling of the cable 3 in the stocking space during introduction of the cable 3 in the stocking device 1 and correct uncoiling of the cable 3 upon its extraction from the stocking device 1. The laying tube 21 is supported by a structure 23 fixed to a bearing 24 pivoting with respect to the support structure 20. The laying device 2 preferably further comprises a balance weight and a braking device (not shown) disposed on or in the bearing 24. In preferred embodiments, the laying device 2 is a tube; however, the laying device 2 may also be an assembly of tubes or rings.

The stocking basket 10, the laying device 2 and the guide tube 14 are preferably equipped with lateral openings 16, 17, 17A, 24B. As previously discussed, the openings permit the cable 3 to be inserted and withdrawn from the stocking basket 10. Accordingly, a portion of the cable 3 can be introduced or extracted laterally from the stocking basket 10 without the cable 3 passing through the entrance or exit openings of the guide tube 14.

A height adjusting device 4 is associated with the laying tube 21. According to this embodiment, the height adjustment device 4 comprises a lower portion 21A which pivots about a Y axis to a central portion 21 B of the length of the tube 21. To achieve this, the laying tube 21 is equipped with a pivoting fitting 40 disposed between the central portion 21B of the tube 21 and the lower portion 21A. The pivoting fitting 40 comprises two pivoting portions 40A, 40B fixed respectively to portions 21A, 21 B of the tube 21. A pivoting device 41 disposed between the pivoting portions 40A, 40B allows the lower and central portions 21A, 21B to pivot between the pivoting portions 40A, 40B. The pivoting device 41 allows the lower portion 21A to pivot about an axis Y coaxial with central portion 21B (FIG. 4). Thus, the lower portion 21A may about the central portion 21B. In order to allow a lateral introduction or extraction of the cable 3, the pivoting fitting 40 is also equipped with a lateral opening 46. In embodiments, the pivoting fitting 40 is closed.

When a certain number of turns have been deposited on the bottom 11 of the stocking basket 10, the height between the opening 22 of the lower portion 21A and the turn to be laid is no longer sufficient for correct laying of the cable 3. This is when the lower portion 21A starts to pivot slightly about the Y axis by means of the pivoting fitting 40. This process maintains a relatively constant laying height. Also, this movement raises the opening 22 with respect to the bottom 11 of the stocking basket 10. In embodiments, the pivoting fitting 40 is equipped with a balancing device 42 (e.g. two counterweights) for balancing the proper weight of the lower portion 21A about the Y axis. The pivoting device 41 may also be provided with a brake device to slow down the pivot movement and prevent instability of the tube portion 21A.

As further seen in FIG. 4, the lower portion 21A is widened toward the opening 22. Preferably the opening 22 is a truncated cone or a trumpet shape so that the opening 22 is aligned for correct laying of the cable 3. The height of the exit opening 22 is adjusted automatically by the cable 3 (i.e. by the longitudinal rigidity of the cable 3) because the cable 3 pivots the lower portion 21 A about the Y axis. In the case of introduction of the cable 3 into the stocking basket 10, the pivoting raises the opening 22 with respect to the bottom 11 of the stocking basket 10 during accumulation of the cable 3. Accordingly, the stocking device 1 is self-regulating. The extent of the adjustment depends mainly on the length of the bent portion of the lower portion 21A closest to the opening 22 or the angle of opening of the truncated cone or of the trumpet.

Upon extraction of the cable 3 from the stocking basket 10, the driving stocking device works in the opposite direction. The driving stocking device pulls the cable 3 from the guide device 11 or the laying tube 21 and causes the laying tube 21 to rotate in the direction opposite to the laying of the cable 3. Also, when the height of the opening 22 adjusts itself automatically, a pivoting of the lower portion 21A tends to lower the opening 22.

When loading the stocking basket 10 with the cable 3, a cable-driving stocking device (not shown), pushes the cable 3 into the guide tube 14. The cable 3 exits the guide collar 14A and enters the laying tube 21 at the upper end 21D where it then exits the opening 22. The cable 3 then lays on the bottom 11 of the stocking basket 10. As previously described, the laying tube 21 pivots about the X axis due to the rigidity of the cable 3, i.e., the cable 3 presses an interior portion close to the opening 22 and pushes back the laying tube 21 toward the rear. This process brings about a laying in successive loops of the cable 3 in the stocking space of the stocking basket 10.

Figure 5:
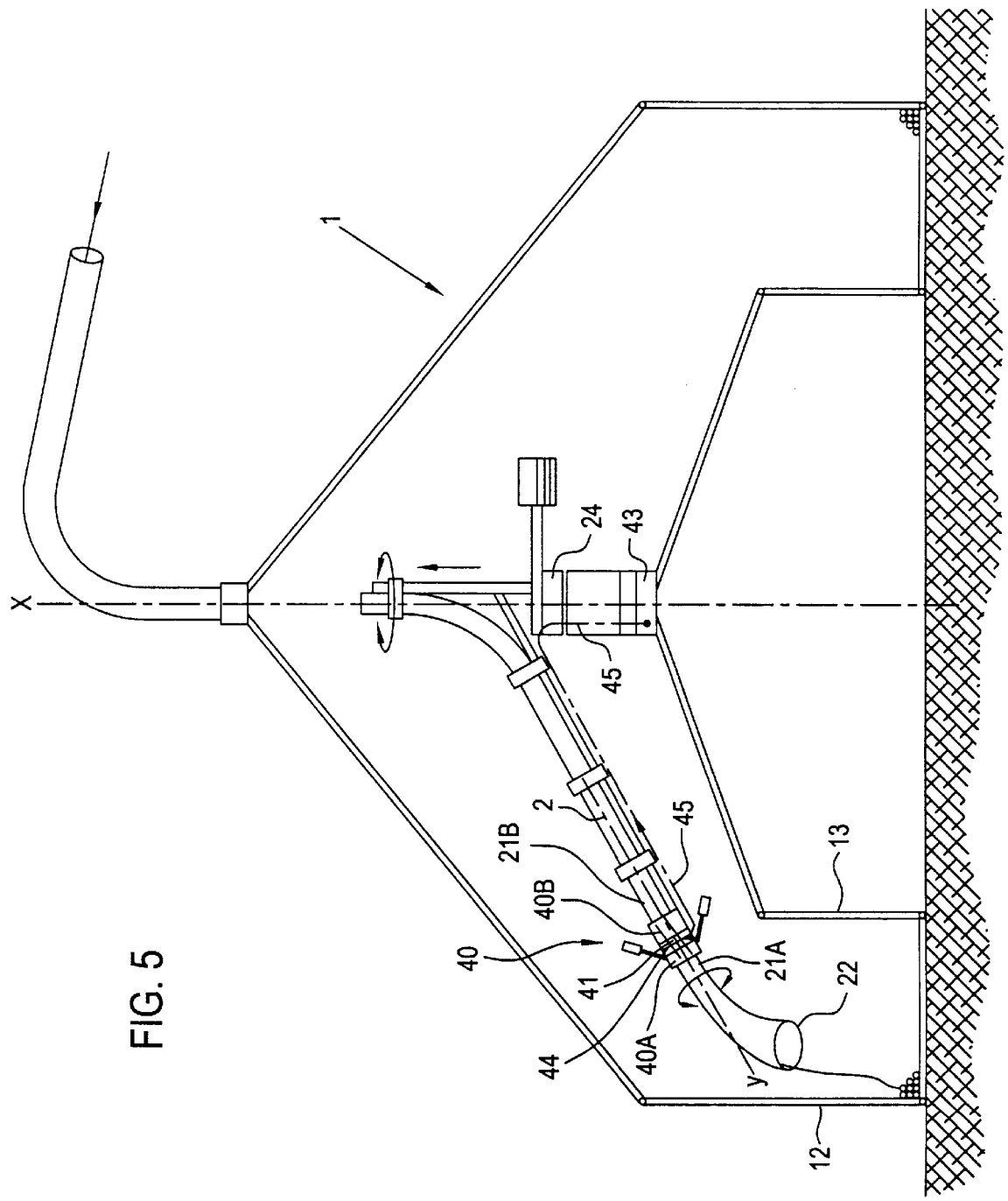
FIG. 5 shows another stocking basket equipped with a laying stocking device having self-regulating height device.

FIG. 5 shows another embodiment of the stocking device 1 adapted for a larger stocking basket 10. In this embodiment, the inner and outer walls 12, 13 are higher than previously described which leaves a larger stocking space between the inner and outer walls 12, 13. In this case, adapting the height of the opening 22 by pivoting the lower portion 21A by means of the pivoting fitting 40 is not enough to raise the laying tube 21 the entire height of the stocking space. Therefore, a height adjustment device 43 mounted on the bearing 24 is provided. The height adjustment device 43 allows the laying tube 21 to be raised or lowered along the X axis. The height adjustment device 43 may be a mechanical, an electrical or a hydraulic device, and is preferably directly controlled by the angular position of the lower portion 21A of the laying tube 21 about the Y axis.

In embodiments, the pivoting fitting 40 is equipped with an angular detection device 44 which checks the angular position about the Y axis of the portion 21A relative to the portion 21 B of the laying tube 21. The detection device sends a control signal, by means of link 45, to the height adjustment stocking device 43.

In embodiments, the angular detection stocking device 43 comprises two detectors that detect a minimum and maximum offset angular position. The lower portion 21A sends an elevation control signal to the height adjustment device 43 when it pivots between the minimum and maximum offset angular positions. The detectors then adjust the height of the lower portion 21A. For example, when the second detector is activated, the lower portion 21A is stopped so that it can no longer be raised or lowered beyond a certain height. The maximum offset angular position detector can also send a signal to the height adjustment device 43 and activate the height adjustment stocking device 43 when a certain fixed value is reached.

In embodiments, the height adjustment stocking device 43 fixes the laying tube 21 in a low position when the cable 3 is introduced into the stocking basket 10. Also, a first adaptation of the height of the opening 22 is obtained by pivoting the lower portion 21A. When the angular detector 44 detects that the pivoting has attained the maximum possible value for a correct laying of the cable 3, it orders the height adjustment stocking device 43 to lift the laying tube 21. The lifting action causes a pivoting of the lower portion 21A which returns to its angular departing position until the end of the lifting of the laying tube 21. In embodiments, this control is managed by the second detector. The lower portion 21A may also stop after a given time or other predetermined value. The process can be repeated until the stocking space is completely full, independently of the height of the stocking space. Also, the same process can be applied in the reverse direction for emptying the cable 3 from the stocking basket 10. Accordingly, the system provides (i) a self-regulated height of the opening 22, (ii) a first fine adjustment achieved by the pivoting of the lower portion 21A, (iii) a general adaptation of height, and (iv) a fine adjustment by pivoting of the lower portion 21A.

Figure 6:
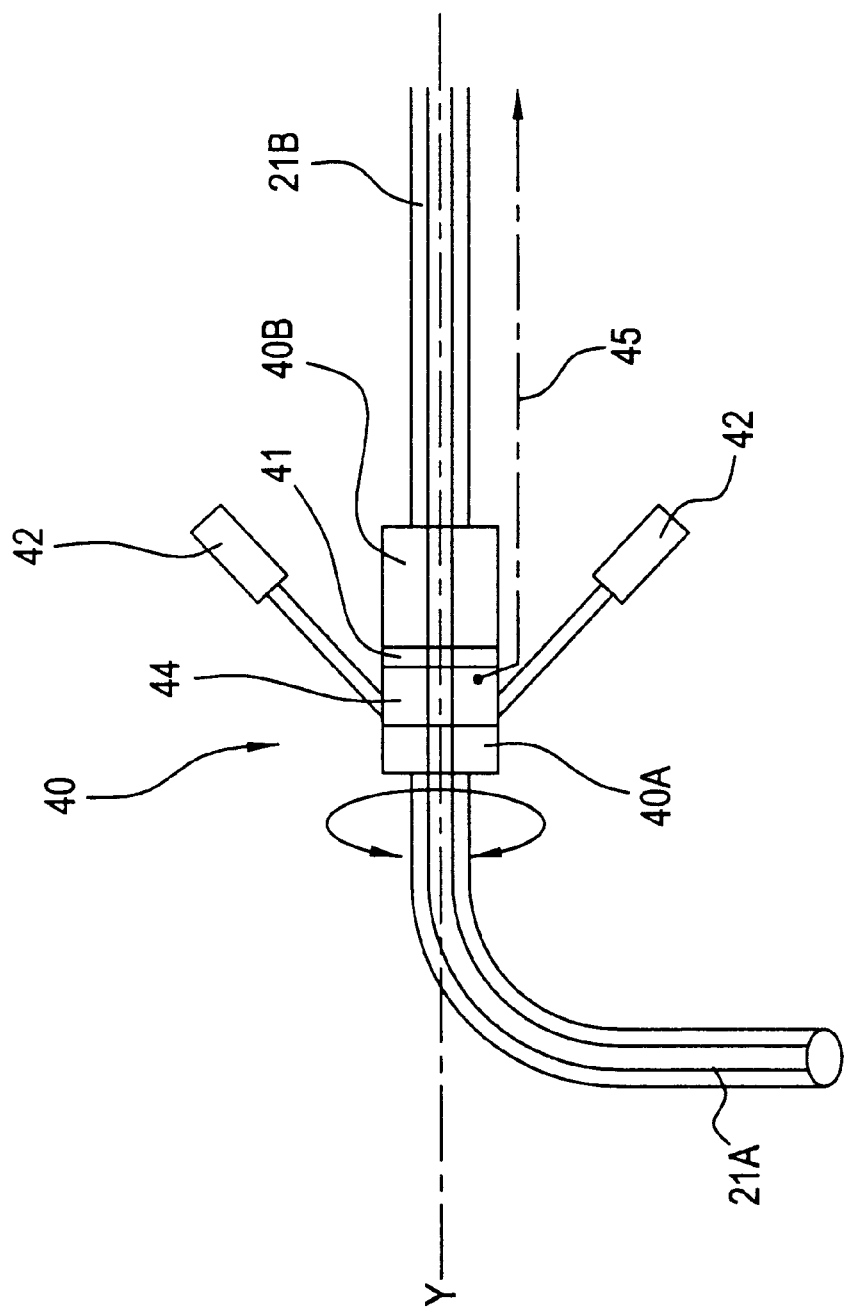
FIG. 6 shows an embodiment of a self-regulating laying stocking device.

FIG. 6 shows another embodiment of the lower portion 21 A of the laying tube 21. In embodiments, the laying tube 21 extends perpendicular to the X axis in the stocking basket 10 and is not trumpet or cone shaped. In this case, the laying tube 21 is curved by approximately 90° so that the height of the laying tube 21 may be adjusted automatically. The height adjustment mechanism in this embodiment is particularly adapted to a stocking basket 10 having a laying device which is non-motorized. However, a driven or other motorized laying device is also contemplated for use with this embodiment of the present invention. The height adjustment mechanism described with reference to FIG. 6 is not limited for use with the embodiment of FIG. 6. The height adjustment mechanism may be used with other embodiments of the claimed invention.

The stocking basket 10 may also be used when delivery of a very long cable is required. In order to form long cables, many elementary lengths are spliced together in succession. However, in order to ensure quality of the cable, a protective sheathing or armoring (which also protects the splices) is installed via sheathing and armoring machines. To achieve such a length of a cable, each elementary length is manufactured in as large a segment as possible. The cable is then coiled on a large diameter cable roll for future splicing. However, when the cable is coiled on a cable roll it is not possible to extract it laterally. Thus, when splicing the cable, it is necessary to (i) wait until an elementary length has been completely unwound from the cable roll when installing the sheathing or armoring, (ii) stop the sheathing or armoring process during a splicing operation and (iii) restart the sheathing or armoring machine until the process ends.

This operation requires a considerable amount of time and requires considerable means to handle the cable rolls, which may weigh in excess of 10 tons. In addition, unwinding the cable rolls must be coupled very precisely with the sheathing or armoring machine in order to accelerate or decelerate the cable rolls when starting up or stopping the sheathing or armoring machine. These successive start-ups and stops diminish the mechanical resistance of the armoring because the armoring is generally not positioned optimally on the cable during the stopping and starting operation.

FIGS. 7A–7F show steps of coiling cables using several stocking baskets 10. FIGS. 7A–7F show (i) two stocking baskets 10A and 10B having a guide tube 14A, 14B, respectively, (ii) a manufacturing machine 5 for finishing a part of the cable 3 (which may be disposed under the sheathing) and (iii) an armoring machine 6 for laying armoring. In embodiments, the direction of production of the cable 3 is from left to right; however, the production of cable 3 may be in any direction. Also, the cable 3 in the stocking baskets 10A and 10B are represented with a limited number of turns for clarity of the Figures, but any number of turns is contemplated for use by the present invention.

The following steps are provided in FIGS. 7A–7F.

Figure 7A:
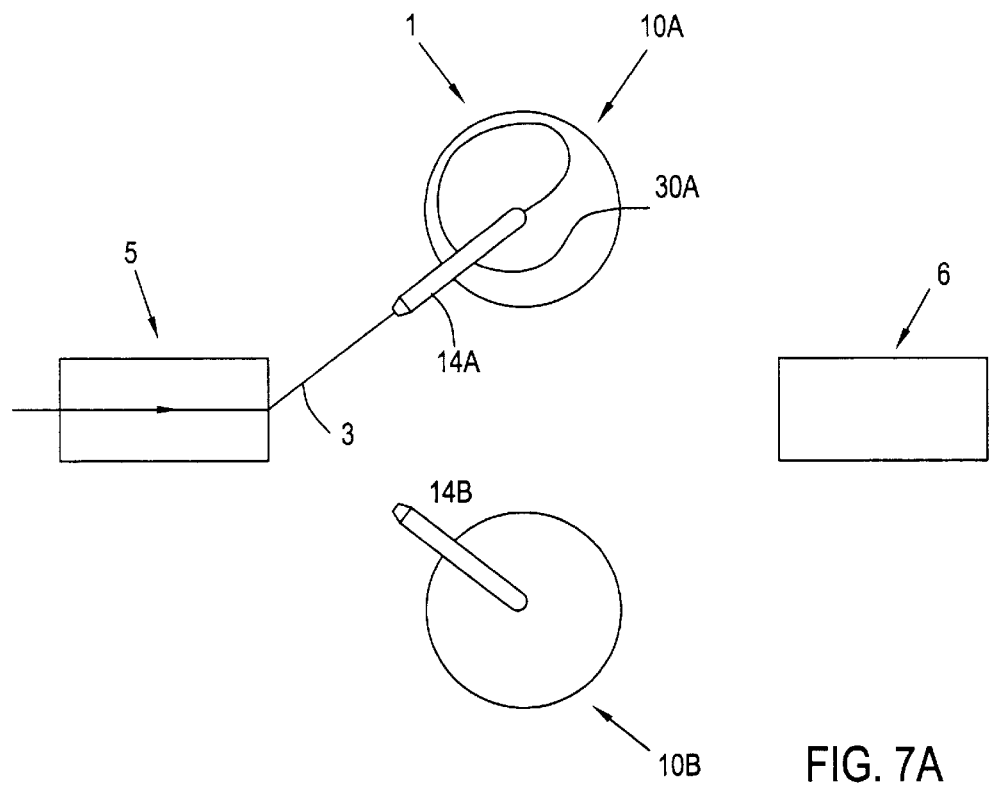
FIGS. 7A to 7F show steps of coiling cables using several stocking baskets.

(i) FIG. 7A shows the production machine 5 feeding the cable 3 to the stocking basket 10A and the free end 30A feeding through the bottom of the basket 10A.

Figure 7B:
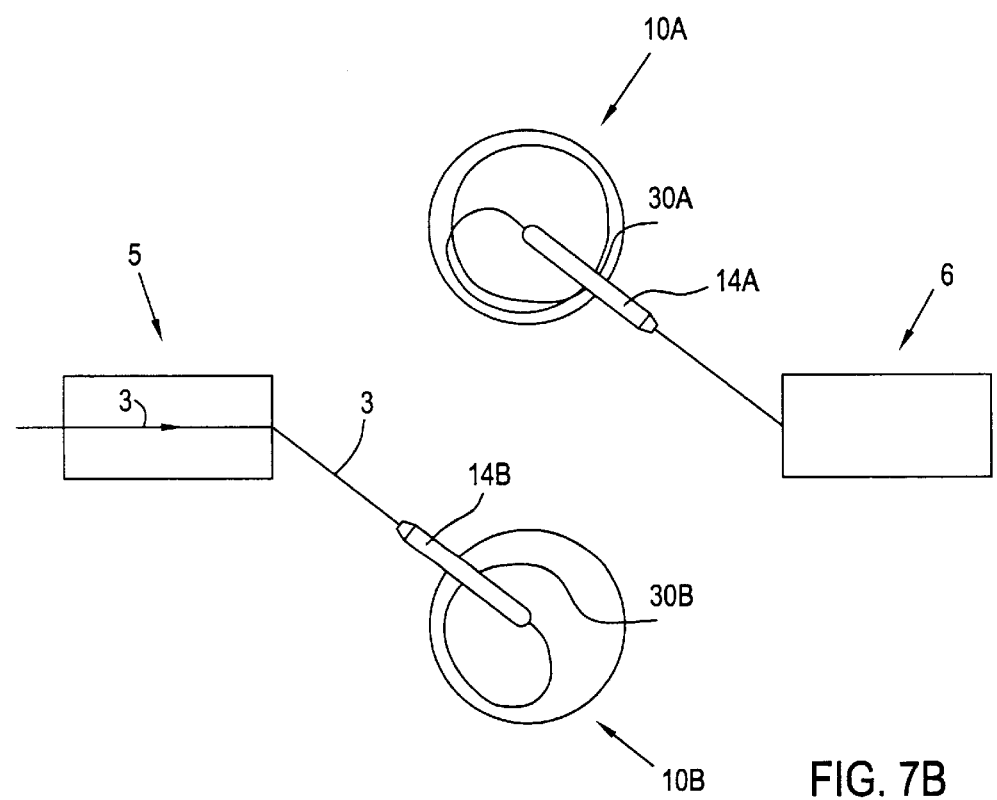

(ii) FIG. 7B shows the production machine 5 feeding through the stocking basket 10B and the free end 30B feeding through the bottom of the stocking basket 10B. The guide tube 14B faces in the direction of the manufacturing machine 5 and the guide tube 14A faces the armoring machine 6.

Figure 7C:
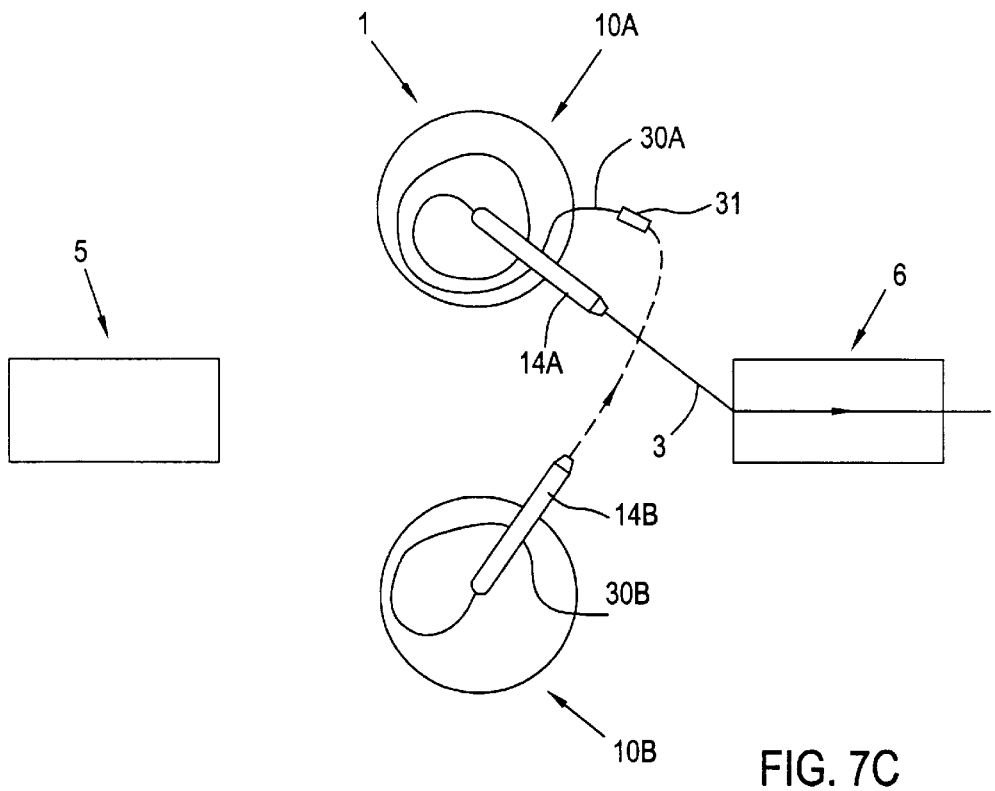

(iii) FIG. 7C shows the upper end of the cable 3 in the stocking basket 10A being extracted through the guide tube 14A and being brought to the armoring machine 6 which starts an armoring process. The upper end of the cable 3 in the stocking basket 10B is extracted through the guide tube 14A and is brought close to the lower end 30A in the stocking basket 10A in order to make a splice 31.

Figure 7D:
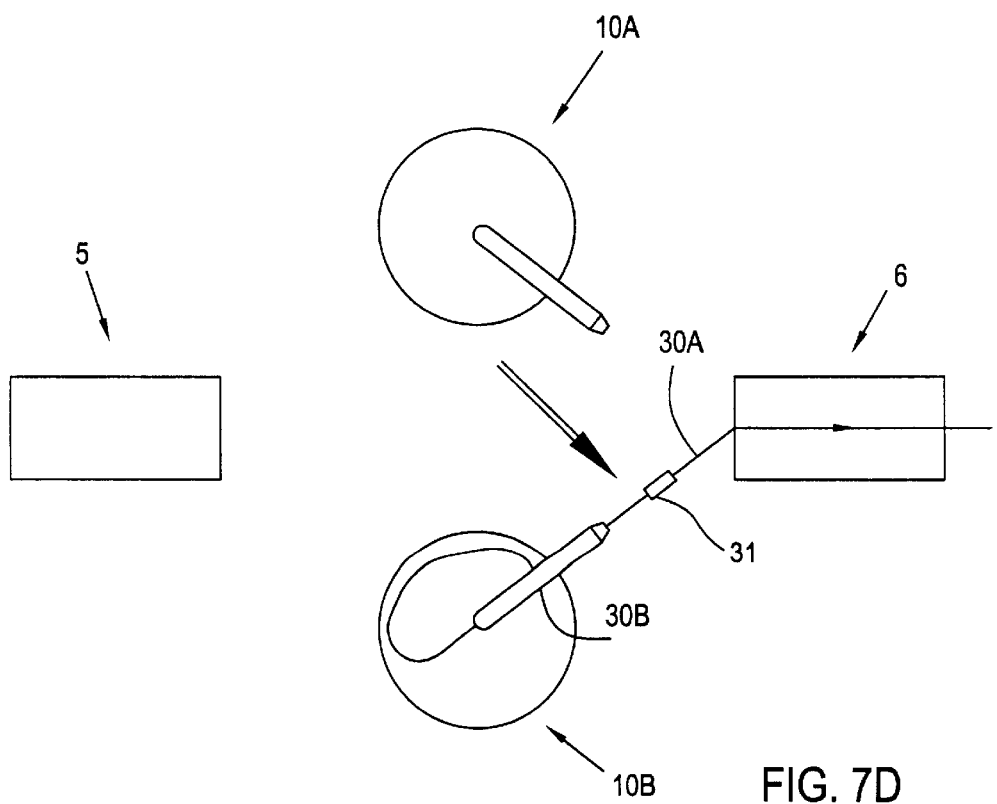

(iv) FIG. 7D shows the cable 3 in the basket 10A being unwound. The portion in front of the lower end 30A is withdrawn from the stocking basket 10B through the lateral openings as described above. This operation is symbolized by the double arrow. In this step, the stocking basket 10B feeds the production machine 6.

Figure 7E:
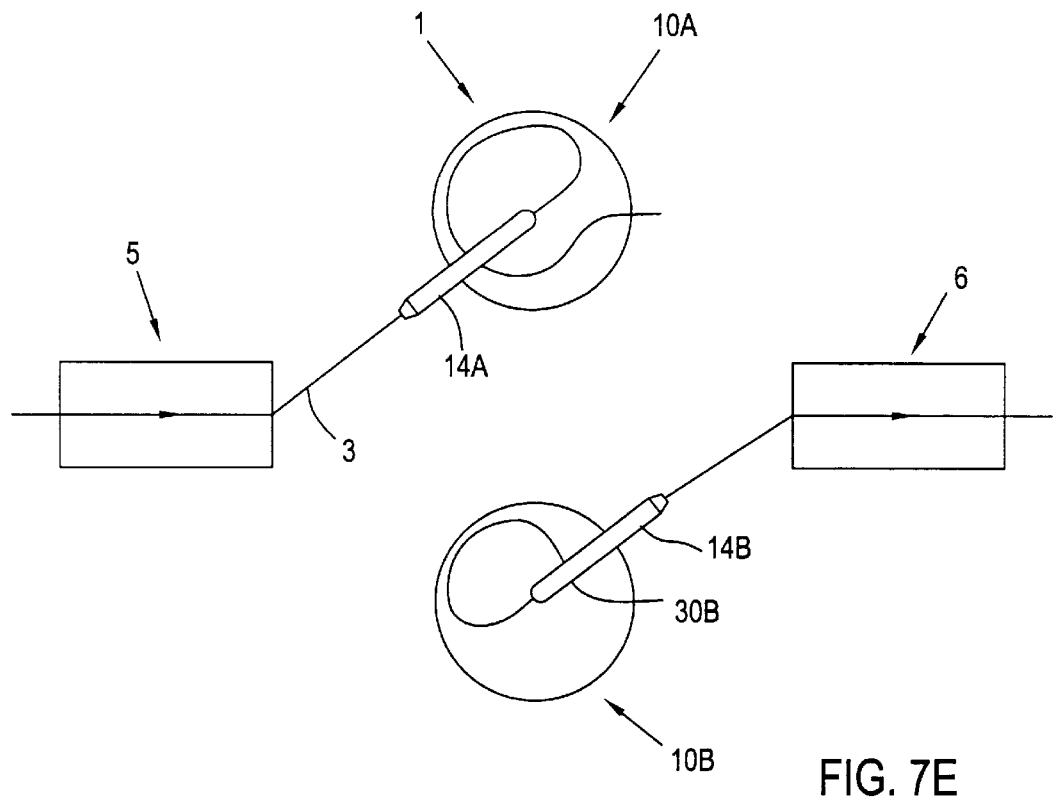

(v) FIG. 7E shows the stocking basket 10B continuing to feed the production machine 6, while the stocking basket 10A is being refilled by the manufacturing machine 5.

Figure 7F:
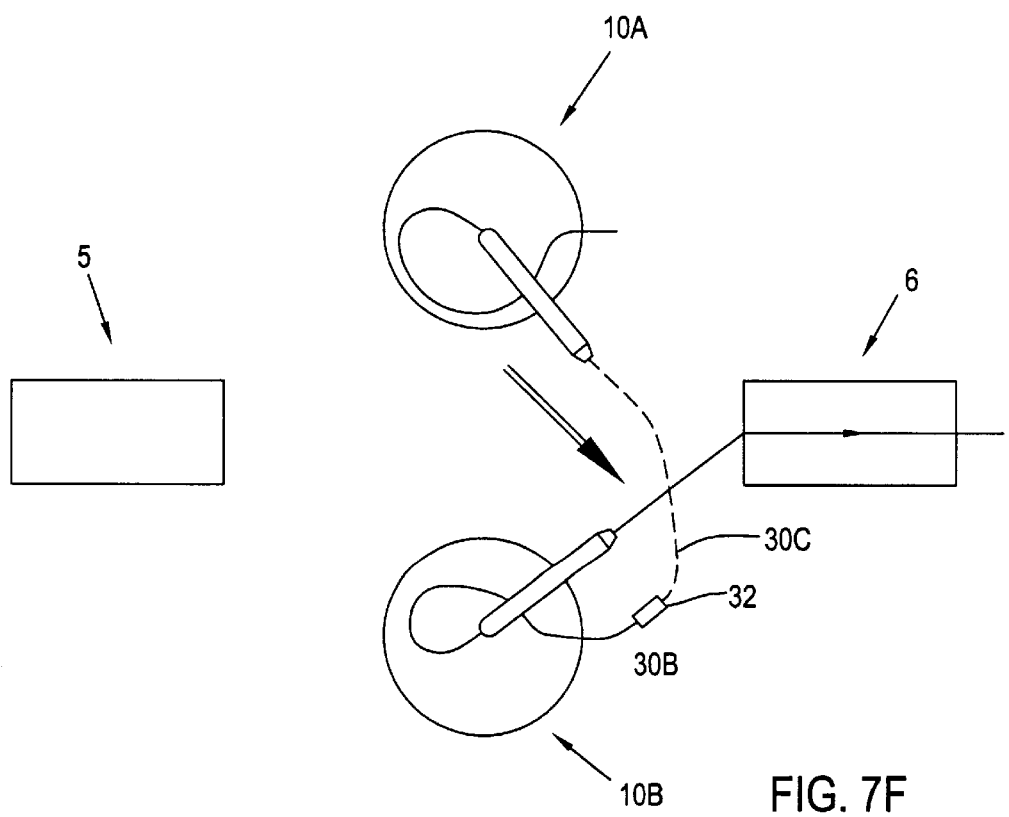

(vi) FIG. 7F shows the stocking basket 10B continuing to feed the armoring machine 6, while the stocking basket 10A is filled. The upper end 30C of the cable 3 is positioned proximate to the lower end 30B of the cable 3 in the stocking basket 10B and a splice 32 is made between the two cables.

The step in FIG. 7F substantially corresponds to the step of FIG. 7C except that the stocking basket 10B replaces the stocking basket 10A. Accordingly, the method described can be carried out during many cycles to obtain a cable of very great length.

Other methods to obtain an elongated element of great length can be carried out using the two stocking baskets described above. For example, depending on the relative speeds of the machines 5, 6 such a method can be used when a machine cannot be stopped, for example, a machine used for an extrusion line for an outer synthetic sheathing. Also, for example, two identical production machines 6 each feeding its own stocking basket or other combinations of machines and stocking baskets depending on a desired operation is also contemplated for use by the present invention. Additionally, by using the method described above, the time needed (i) for a machine to fill a stocking basket, (ii) to make the splice and (iii) for the cable to exit the stocking basket, is less than the time needed for the machine to carry out its operation of laying the sheathing on a stocked elementary length. Thus, because the splices are being made while the manufacture of cable is being carried out, the time required for these splicing operations is provided within the total manufacturing time. In addition, the method described above does not require any large rotating weight which has to be accelerated or decelerated a number of times.

This invention has been described in detail with reference to preferred and alternate embodiments. It should be appreciated that the specific embodiments described above are merely illustrative of the principles underlying the inventive concept. It is therefore contemplated that various modifications of the disclosed embodiments will, without departing from the spirit and scope of the invention, be apparent to persons of ordinary skill in the art.

What is claimed is:

1. A method for stocking a coilable element in a stocking device comprising a stocking basket having an opening, a guide stocking device and a laying stocking device having an opening formed on an outer wall for laying the coilable element, the method comprising:

passing a portion of the coilable element through the guide stocking device;

sliding the coilable element along the laying stocking device, toward the stocking basket, so that the coilable element naturally coils in the stocking basket due to a longitudinal rigidity of the coilable element;

inserting portions of the coilable element in the stocking device through the openings located in at least the stocking basket and guide stocking device; and withdrawing portions of the coilable element from the stocking device through at least the openings of both the stocking basket and the guide stocking device.

2. The stocking method of claim 1, wherein the laying stocking device is a rotary type laying stocking device; and wherein a reaction to an advancing movement of the coilable element due to the longitudinal rigidity of said coilable element drives the rotary type laying stocking device.

3. The stocking method of claim 2, wherein the rotary laying stocking device includes an opening different from the openings of the stocking basket and guide stocking device, and wherein the coilable element is at least one of inserted and withdrawn from the opening of the rotary laying stocking device.

4. The stocking method of claim 1, further comprising automatically orienting the guide stocking device to have a direction of a supply of the coilable element.

5. A stocking device for a coilable element comprising:

a stocking basket having a bottom wall serving as a winding base;

an outer wall having an edge disposed against the bottom wall, the outer wall having an opening so that the coilable element can be threaded therethrough;

a guide stocking device disposed proximate to the stocking basket, the guide stocking device having an opening formed on an outer wall, the opening of the guide stocking device being different than the opening of the stocking basket; and a laying stocking device disposed proximate to the guide stocking device, the laying stocking device angularly leads a portion of the element to be coiled from the guide stocking device to the stocking basket, wherein portions of the coilable elements are at least one of inserted and withdrawn through the openings of both of the stocking basket and the guide stocking device.

6. The stocking stocking device of claim 5, wherein the laying stocking device is a fixed laying stocking device.

7. The stocking device of claim 6, wherein the fixed laying stocking device includes a convex conical shaped cover disposed on an inner wall of the stocking basket.

8. The stocking device of claim 5, wherein the laying stocking device is a rotary type laying stocking device and comprises at least one substantially radial tubular segment extending from a location proximate to one end of the guide stocking device into the stocking basket, said tubular segment being pivotal about a substantial vertical central axis of the stocking device.

9. The stocking device of claim 8, wherein the tubular segment comprises an opening formed in an outer wall, the opening being different from the openings of the stocking basket and the guide stocking device.

10. The stocking device of claim 9, wherein the opening of the tubular segment is closed by closing means.

11. The stocking device of claim 8, wherein the rotary laying stocking device includes braking means for braking the tubular segment with respect to the stocking basket.

12. The stocking device of claim 8, wherein the rotary laying stocking device includes adjusting means for adjusting a height of an end of the tubular segment with relation to the stocking basket.

13. The stocking device of claim 5, wherein at least one of the openings of the stocking basket and the guide stocking device are closed by a closing device.

14. The stocking device of claim 5, wherein the guide stocking device comprises at least one tubular segment disposed substantially radially to the outer wall of said stocking device, said tubular segment being pivotable about a substantial vertical central axis of said stocking device.

15. A method of stocking coilable elements in a stocking device comprising a stocking basket, a guide stocking device that guides the coilable element into the stocking basket having an opening and a laying stocking device having an opening formed on an outer wall that lays the coilable elements into the stocking basket, the method comprising:

inserting a free length of cable through at least the openings in the stocking basket and guide stocking device;

coiling a remaining length of the cable in the basket; and withdrawing a last free length of the cable from the stocking device through the openings in the stocking basket and the guide stocking device, wherein driving the laying stocking device is obtained by a reaction to an advancing movement of the coilable element.

16. The method of claim 15, wherein the stocking device is used for transwinding the cable.

17. The method of claim 15, wherein the cable includes at least one optical fiber.

18. A rotary laying device for coiling into turns an element in a stocking basket of a stocking device, the rotary laying device comprising:

a substantially tubular segment having an upper portion and an end portion, an entrance proximate to the upper portion and an exit proximate to the end portion, the exit being substantially within a space of the stocking basket; and a substantially curved portion proximate to the exit of the tubular segment, the curved portion being pivotably mounted about an axis substantially parallel to a central portion of the tubular segment, the curved portion facing the space of the stocking basket, pivoting of the curved portion proximate the exit and the end portion being achieved by a reaction of the coilable element between the exit and against one of (i) a bottom of the stocking basket and (ii) the turns coiled at the bottom of the stocking basket due to a longitudinal rigidity of the coilable element.

19. The rotary laying device of claim 18, further comprising a pivoting fitting, the pivoting fitting comprising:

a first fitting portion fixed to a central portion of the tubular segment;

a second fitting portion fixed to the end portion of the tubular segment; and a pivoting fitting device coupled between the first fitting portion and the second fitting portion, the pivoting fitting device allowing the end portion to pivot about an axis coaxial to the central portion.

20. The rotary laying stocking device of claim 19, wherein the pivoting fitting device comprises a braking device for slowing pivoting movement of the pivoting fitting device.

21. The rotary laying stocking device of claim 19, wherein the pivoting fitting device comprises a balancing device that balances a weight of the curved portion.

22. The rotary laying stocking device of claim 19, further comprising a height adjustment device disposed proximate to the stocking basket, the height adjustment device adjusting a height of the tubular segment.

23. The laying stocking device of claim 22, wherein the pivoting fitting device comprises an angular detection device, the angular detection device controlling the height adjustment device.

24. The rotary laying stocking device of claim 23, wherein the angular detection device comprises at least one detector that detects a predetermined angular position of the tubular segment.

25. The rotary laying stocking device of claim 18, wherein:

an end of the tubular segment is disposed relative to an axis of rotation in the stocking basket, and the end portion of the rotary laying stocking device is flared out in the direction of the exit.

26. The rotary laying stocking device of claim 18, wherein:

a central portion of the tubular segment is disposed perpendicular relative to an axis of rotation in the stocking basket, and an end of the tubular segment is curved by approximately 90 degrees and includes a substantially constant cross section.

27. A method of stocking a coilable element in a stocking device comprising:

laying a first length of cable;

introducing a free length of the first length of cable into the stocking device through at least one lateral opening;

coiling a remainder of the length of cable into the stocking basket;

extracting the cable from the stocking basket to be laid; and withdrawing a last free length of the cable from the stocking device through the lateral openings.

28. A stocking device for stocking at least one coilable element, comprising:

a stocking basket having a bottom, an outside wall and an inside wall, the outside wall and the inside wall opposing one another and being fixed to a periphery of the bottom, the bottom serving as a winding base, the outside wall having at least one lateral opening;

a guide stocking device disposed proximate to the stocking basket and having a guide opening;

a rotary laying device which directs the at least one coilable element from the guide stocking device toward a stocking space of the stocking basket, the rotary laying device having an opening; and a height adjustment device disposed on the rotary laying device, the height adjustment device adjusting the height of the rotary laying device, wherein the at least one lateral opening, the guide opening and the opening permit the coilable element to be either inserted into or withdrawn from the stocking basket.

29. The stocking device of claim 28, wherein the stocking device is used for transwinding the cable.

30. The stocking device of claim 28, wherein the height adjustment device comprises:

a pivoting lower portion;

a pivoting upper portion; and a pivoting fitting coupled between the lower pivoting portion and the upper pivoting portion.

31. The stocking device of claim 30, wherein the height adjustment device maintains a substantially constant height of the rotary laying device above a stack height of the coilable element on the bottom of the stocking basket.

32. The stocking device of claim 30, wherein the height adjustment device includes a substantially 90 degree curve in approximately a central portion of the rotary laying device.

33. The stocking device of claim 30, wherein an end of the rotary laying device has a flared out shape.

34. The stocking device of claim 30, wherein the height adjustment device adjusts a height of the rotary laying device along a horizontal axis relative to the bottom of the stocking basket.

35. The stocking device of claim 28, wherein the height adjustment device is coupled the stocking basket.

36. The stocking device of claim 35, further comprising an angular detection device able to activate the height adjustment device.

37. The stocking device of claim 36, wherein the angular detection device comprises at least two detectors that detect at least one of a minimum offset angular position and a maximum offset angular position between the lower pivoting portion and the upper pivoting portion of the rotary laying device.

38. A method of manufacturing an elongated coilable element, the elongated coilable element comprising a plurality of elementary lengths of the coilable element joined end to end, the method using at least a first stocking device having a first guide device and a second stocking device having a second guide device, each of said first and second stocking devices stocking one of the plurality of the elementary lengths of the coilable element in sequence that is received from a manufacturing machine and feeding the coilable element to a production machine, the method comprising:

stocking a first elementary length in the first stocking device;

feeding the first elementary length into a production machine, the coilable element exiting from the first guide device;

stocking a second elementary length having an upper end in the second stocking device;

withdrawing the second elementary length from the second stocking device through the second guide device;

placing the upper end of the second elementary length proximate to a lower end of the first elementary length, the lower end of the first elementary length exiting through a lateral opening of the first stocking device;

splicing the upper end of the second elementary length and the lower end of the first elementary length together; and extracting the first elementary length from the first stocking device when a single turn of the first elementary length in the first stocking device remains, the first elementary length being extracted from the first stocking device through lateral openings provided in the first stocking device so that the production machine can be fed by the second stocking device.

39. The method of claim 38, further comprising:

stocking a new elementary length having an upper end into the first stocking device;

withdrawing the upper end of the new elementary length from the first guide device;

placing the upper end of the new elementary length proximate to a lower end of the second elementary length, the lower end of the second elementary length exiting through a lateral opening of the second stocking device;

splicing the upper end of the new elementary length and the lower end of the second elementary length together; and extracting the second elementary length from the second stocking device when a single turn of the second elementary length in the second stocking device remains, the second elementary length being extracted from the second stocking device through lateral openings provided in the second stocking device so that the production machine can be fed by the first stocking device.

40. The method of claim 38, wherein the steps are repeated for a plurality of elementary lengths until a desired length of the coilable element is achieved.

41. The method of claim 38, wherein any of the elementary lengths is in the production machine less than (i) a time needed to load the first stocking device and the second stocking device with any one of the elementary lengths, (ii) a time needed to splice at least an upper end of one of the elementary lengths and a lower end of another elementary length and (iii) a time needed for any one of the elementary elements to be withdrawn from the first stocking device and the second stocking device at a last turn.

42. The method of claim 38, wherein the production machine does not stop until an end a last elementary length is withdrawn from one of the first stocking device and the second stocking device.

* * * * *